United States Patent [19]

Lacombe et al.

[11] Patent Number: 4,613,021
[45] Date of Patent: Sep. 23, 1986

[54] BRAKE DISC WITH REMOVABLE PADS

[75] Inventors: Alain Lacombe, Pessac; Michel Vivés, Eysines, both of France

[73] Assignee: Société Européene de Propulsion, Puteaux, France

[21] Appl. No.: 678,233

[22] Filed: Dec. 5, 1984

[30] Foreign Application Priority Data

Dec. 21, 1983 [FR] France ................... 83 20496

[51] Int. Cl.$^4$ ............................................. F16D 65/12
[52] U.S. Cl. .......................... 188/218 XL; 188/251 A; 188/264 AA; 192/107 R; 192/70.13
[58] Field of Search .......... 188/218 XL, 73.2, 251 A, 188/264 AA, 264 A; 192/70.13, 107 R, 107 C

[56] References Cited

U.S. PATENT DOCUMENTS

| 1,625,933 | 4/1927 | Bing | 192/107 R |
|---|---|---|---|
| 2,485,082 | 10/1949 | Bachman | 188/218 XL |
| 2,708,492 | 5/1955 | Helsten | 188/218 XL |
| 2,893,519 | 7/1959 | Martin | 188/218 XL |
| 3,295,641 | 1/1967 | Eaton et al. | 188/218 XL |
| 3,403,759 | 10/1968 | Holcomb, Jr. | 192/107 R |
| 3,599,766 | 8/1971 | Ely | 192/107 R |
| 3,759,354 | 9/1973 | Dowell et al. | 188/251 A X |
| 4,018,311 | 4/1977 | Tickle | 188/218 XL |

FOREIGN PATENT DOCUMENTS 2295304  7/1976  France .
2326623  4/1977  France .

Primary Examiner—George E. A. Halvosa
Attorney, Agent, or Firm—Shenier & O'Connor

[57] ABSTRACT

The disc consists of a core (1), being a hub (3) surrounded by spokes (2), and friction pads in the form of annular sectors (8) having recesses (15, 16) in their inside backs (10) to cooperate with the spokes (2) in providing radial guidance and angular locking. Elastic means are provided for removably axially mounting the sectors on the core (1), which elastic means (19, 6) also serve to removably radially mount the sectors on the core.

5 Claims, 4 Drawing Figures

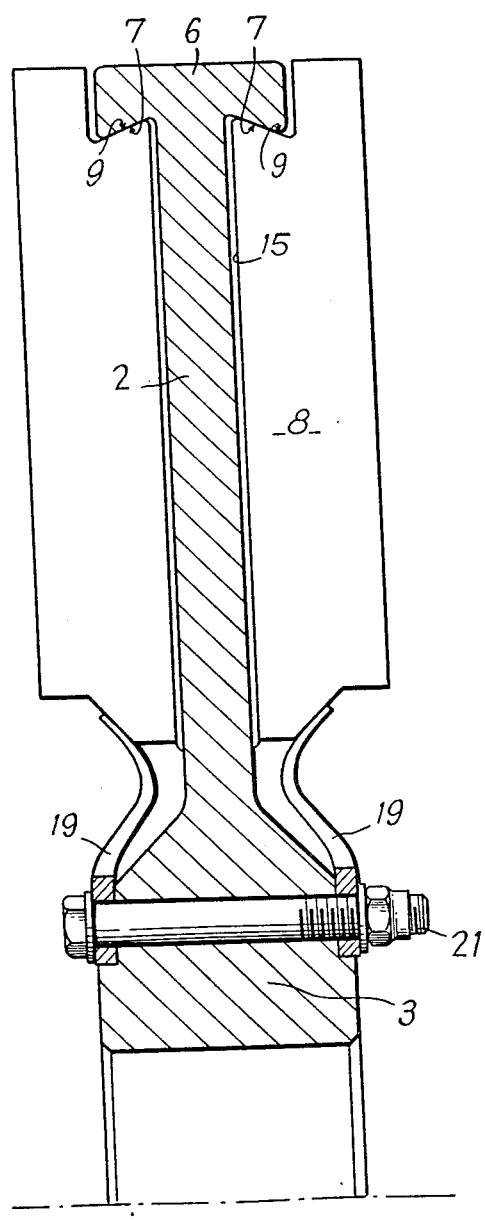

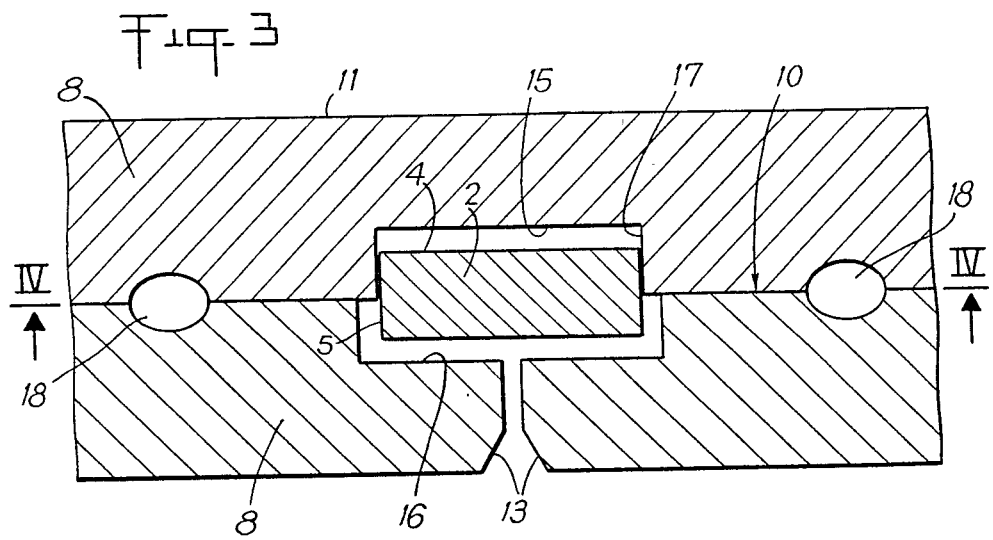
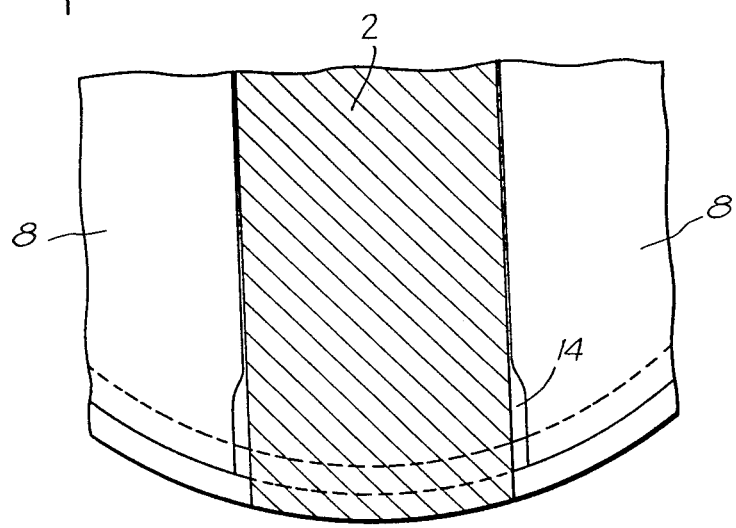

BRAKE DISC WITH REMOVABLE PADS

This invention concerns a disc brake disc consisting of removable friction pads fitted on both sides of a core designed to withstand mechanical stresses.

The energies expended in braking heavy ground vehicles driven at high speeds are considerable. Even the most efficient conventional disc brakes must be used in quantities sufficient to avoid heat damage to the materials of the disc. This results in a large bulk and in heavy unsprung rotating masses which limit vehicle overall performance.

Moreover, as concerns high-powered braking (emergency braking), conventional discs—whether of cast iron or refractory steel—come under considerable thermal stresses and are prone to cracking, which requires their dismantlement and replacement. Disc replacement is generally a difficult and costly maintenance operation, often involving a complete dismantling of the axle.

Also, in braking, the high energy dissipations generate very high temperatures in the disc. These cause substantial expansions bringing about mechanical stresses in the disc-to-hub anchoring points, often leading to their breakage. To avoid such risks, the manufacturers often utilize resilient hubs based on very special steels, with complex shapes entailing fastidious manufacturing procedures.

Various attempts have been made to dissociate the friction and heat dissipation function from the function of transferring mechanical stresses. This is the reason discs of the type initially mentioned hereinabove have already been proposed. Documents FR-A-2324945, 2357789, 2359321 and 2470299 all testify, to various extents, to the efforts already made in this area.

The systems proposed hereto however are not entirely satisfactory. Their main drawbacks can be summarized as follows: use of heat-limited materials, bulky construction, precariousness of mechanical links between the disc and the hub, and cumbersome, costly maintenance.

It is the object of this invention to provide a new brake disc obviating the above-mentioned disadvantages, yet enabling easy adaptation to the brake systems now in routine use (calipers, surrounding parts, axle linkage).

The invention satisfies this goal by providing a disc core consisting of a hub surrounded with spokes, brake pads consisting of annular sectors with lands and recesses in their inside backs cooperating with the spokes to ensure both radial guidance and angular locking, elastic means for removably, axially mounting the sectors on the core and elastic means for removably, radially mounting the sectors on the core.

The invention thus fully separates the friction and heat dissipating function from the mechanical stress transfer function.

Advantageously, the elastic means for axially and radially mounting the sectors on the one hand comprise hooks located at the ends of the spokes and forming oblique stops against both axial and radial movement, cooperating with mating oblique surfaces on the outer edge of the sectors, and on the other hand comprise elastic rings attached to the hub of the core and bearing elastically on matching oblique surfaces in the inner edge of the sectors.

Also advantageously, the sectors on each side of the core bear axially against one another back to back.

To further advantage, in the case where each sector is contiguous to a plurality of spokes, the oblique portion of the outer edge thereof is cut back in line with the hooks of some of said spokes to allow differential expansions to occur freely as the brake is operated.

To still further advantage, the land and recess work on the inside back of each sector includes both a radial center slot to cooperate edgewise with the edge walls of a spoke, said slot being deep enough to allow a clearance between the bottom thereof and the flat of the spoke, and two radial half-width slots in the ends of the sector leaving room, with similar clearance, for two other spokes.

Grooves are provided in the sector backs for internal ventilation.

Advantageously, the sectors on one side of the core are circumferentially offset a half-sector's breadth from the sectors on the other side of the core.

Each sector covers two angular spaces between spokes.

Each disc advantageously comprises six or eight spokes.

In summary, the invention utilizes:

friction pads in the form of annular sectors arranged on the faces of the disc and being free to expand both axially and radially and a metal core with spokes supporting the friction pads without stressing them, transmitting the mechanical stresses and free to expand radially, thus providing a simple architecture, the hub being integrated with the core.

By utilizing carbon-carbon or carbon-silicon-carbide pads, it is possible to substantially exceed the thermal limits of conventional materials thus enabling a considerable weight reduction and avoiding some of the previously-mentioned disadvantages.

The caliper brake shoes can in this case be made of the same material as that used for the disc friction pads.

Carbon-carbon or carbon-silicon-carbide composites are the strongest materials available today and afford a high friction coefficient even at high temperatures. In addition, they provide lower abrasion than any conventional lining.

These materials are basically characterized by:

very high specific heat (roughly twice that of steel) which increases with temperature, up to at least 1500° C., low density (roughly three to four times lower than steel), excellent mechanical characteristics and a great resistance to deformation (yield strength) at all temperatures occurring during braking, a very low coefficient of expansion in all spatial directions (about three to five times lower than steel), excellent thermal shock resistance, different conductivities according to the spatial orientations considered (approximately 25 to 250 W/m.°C.), which are adjustable, however, outstanding friction characteristics, ie. a mean dynamic coefficient $\mu \geq 0.30$, and very low wear, even at high operating temperatures, compared with conventional or sintered ceramic pads, on the order of three to four times lower wear.

The several features and advantages of the invention will be more readily understood in reading the following description of a preferred embodiment thereof, with reference to the appended drawings wherein:

FIG. 2 is a half-cross-sectional view, taken axially, of one of the spokes of the disc core;

FIG. 3 is a detailed of a spoke and its associated disc parts, taken in circular cross section, orthogonally to said spoke; and FIG. 4 is a detailed view taken along line IV—IV of FIG. 3.

Figure 1:
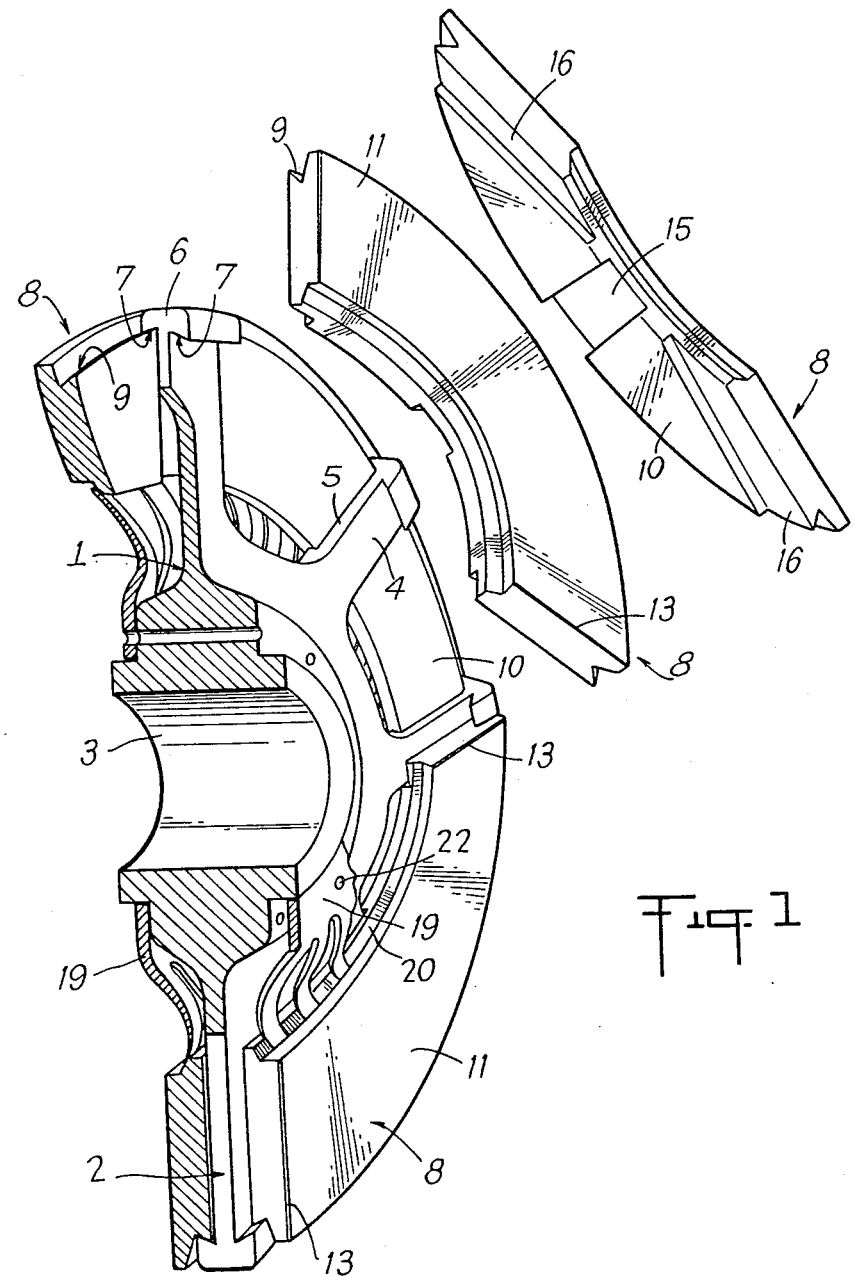
FIG. 1 is a perspective view, partially broken out and exploded, of a brake disc according to the invention.

The disc comprises a metal core 1 consisting of six or eight radial arms or spokes 2 spaced equally apart around a center ring 3, which acts as a hub.

Said spokes 2 have a rectangular section (ie. they have top and bottom surfaces 4 and edges 5) and end in a flange 6, shaped as a double hook with points toward the center of the disc establishing an oblique bearing 7 on each side of the core.

The spokes 2 can withstand substantial mechanical stresses and transmit them to the hub 3 which transfers them to the axle attached thereto, but not shown in the drawing.

The friction pads consist of sectors 8 (each disc face can have three or four sectors) fitted on each side of the spokes 2 of the metal core 1. FIG. 1 shows sectors 8 as fitted, attached to both sides of the disc, and in the exploded view, two similar sectors oriented two different ways to show their outside friction surface 11 and their inside, mounting surface or back 10, respectively.

Said sectors 8 are lockably mounted near the ends of the spokes 2 against the spoke flanges 6, being hooked and held both radially and axially by their outer edges. The bearing parts 7 of the hooks are inclined at an angle in relation to the axis of the disc ensuring not only a secure holding of the sectors 8, but also easy mounting of the sectors. Said oblique bearing surfaces 7 in the flanges 6 cooperate with matching oblique bearing surfaces 9 on the outer edge of the sectors 8.

The sectors 8 fitted to one face of the disc bear against the backs 10 of the sectors fitted to the other face. Back-to-back sectors 8 are circumferentially offset by an angle equal to the angular spacing of the spokes (60° or 45°), or stated otherwise, by half the angular breadth of a sector 8.

This arrangement provides a good bending strength for the sectors or pads 8 as well as suitable parallelism of the friction surfaces 11 and precludes too-violent contact of the brake shoes with the sectors' chamfered edges 13 (FIG. 3). Furthermore, in bearing on each other, the sector 8 backs 10 are kept from contacting the supporting spokes 2, thus reducing heat transfer to the metal core and promoting spoke ventilation.

In fact, contact between the pad sectors 8 and the spokes 2 occurs only over the area of the spoke edges 5, this contact being enough to take up the mechanical stresses involved, whilst allowing a relief 14 (FIG. 4) for air to flow around the end of the spoke. This is accomplished by means of radial slots 15 and 16 provided in the sector or pad back in the middle and at the ends, respectively, of each sector 8 to enable nesting of the spokes 2. The depth of slots 15, 16 is defined so as to leave enough clearance over the top or outside surface 4 of the spokes 2 for their ventilation.

Moreover, each sector pad 8 transmits the friction forces it receives to only one of the spokes 2 of the metal core 1. As can be seen from FIG. 3, only the center slot 15 of sector pads 8 has walls 17 in actual contact with the edges 5 of the nested spoke 2—a feature which allows the pad 8 to work in compression in the same way regardless of the disc's direction of rotation. The spokes 2 thus alternatingly take up the frictional forces from the sectors on opposite faces of the disc. For applications in which the operating temperatures affecting the disc, or more specifically the metal core itself, further self-ventilation can be provided by adding grooves or channels 18 in the backs 10 of the sectors 8.

In the embodiment illustrated by the drawings, each pad 8 may come into radial contact with as many as three spoke flanges. This arrangement may not always be compatible with the requirement for unconstrained differential expansion. Therefore, it may be envisaged that, in order to obtain and maintain the same radial contacts between the spoke flanges 6 and the pads 8 in spite of the thermal variations occurring during braking, the inclined bearing surface 9 at the center of the pad (in line with the center slot 15) facing the inclined bearing surface 7 of the flange 6 of the corresponding spoke be provided with a relief, or, alternatively, that the inclined bearing surfaces 9 at the ends of the pad 8 (in line with the end slots 16), facing the inclined bearing surfaces 7 of the flanges 6 of their corresponding spokes be provided with a relief. Under the first alternative, only two radial contact points at the ends of the sector pads will be subjected to centrifugal stresses; under the second alternative, only a single central radial contact point will be thus stressed.

Finally, to fully secure the sector pads 8 axially, tightly back to back and radially applied to the spoke-end flanges 6, elastic or spring-like rings 19 are brought to bear against a tapered bearing surface 20 machined around the internal periphery of the sector pads 8, the angle of said tapered surface being defined to allow the pads to move freely relative to one another. The spring rings 19 are supported by the hub ring 3 of the metal core 1 and fastened by bolts 21. They allow the self-centering of the sectors 8 while leaving them free to expand in relation to the core 1, thus avoiding an accumulation of stresses. These spring rings are provided with holes 22 for the bolts 21 and feature radial fingers serving as bent leaf springs the ends whereof push against the tapered bearing surface 20.

Due to the simple shape of the metal core 1, comprehending the hub 3, the control over heat levels in the spokes 2 and the smallness of the accumulated stresses, due mainly to the spokes' freedom to expand, make it possible to utilize refractory steel drop-forgings with well-defined compositions and a very high degree of reproducibility as well as castings with outstanding mechanical properties.

The spring rings 19 are type 15CDV6 or 28CDV5 refractory steel drop forgings. Their reproducibility is thus established.

Utilizing such a disc equipped with carbon-carbon or carbon-silicon-carbide pads in a railway-type braking system provides the following advantages:

a weight gain (reduction) of roughly 60% compared with brake systems based on conventional discs, a space saving of about 50%, disc life equalling that of conventional discs, caliper brake shoe life approximately four times longer than with traditional brake shoes, easy maintenance, with short vehicle out-of-service times, and fully safety of operation, meaning good braking of vehicles even under exceptional and very severe conditions that would destroy conventional brake materials.

The disc according to the invention is perfectly suited for use in railway vehicle brake systems and particularly in high-speed trains.

It can also be utilized in heavy utility vehicles, construction machinery, firetrucks, tanks and other vehicles.

What is claimed is:

1. A disc brake disk comprising a core designed to withstand mechanical stresses, said core including a hub, a plurality of spokes surrounding said hub and hooks at the end of said spokes, each of said spokes having two opposite flat faces and two opposite edges, removable friction pads fitted on both sides of said core, each of said friction pads including a plurality of annular sectors, each sector having an axially outside friction surface and an axially inside mounting surface with lands and recesses, each sector having a radially outer edge with an oblique surface and a radially inner edge with an oblique surface, said hooks cooperating with the oblique surfaces of the outer edges of said sectors to form stops against both axial and radial movement of said sectors, said lands of said sectors on each side of said core bearing axially against one another back to back, each sector covering two angular spaces between spokes by overlapping one middle spoke and halves of two side spokes, said lands and recesses comprising a radial center slot having a bottom and edge walls and two radial half-width slots in the ends of the sector, said edge walls cooperating with said edges of said middle spoke for radial guidance and annular locking of the sector, a clearance being left between said bottom and said flat surface of said middle spoke, said half-width slots leaving room with clearance for said side spokes, the sectors on one side of the core being offset circumferentially relative to the sectors on the opposite side of the core by a half-sectors breadth and spring rings attached to the hub pushing elastically against corresponding oblique surfaces of the inner edges of the sectors so as removably to mount the sectors on the core.

2. Disc according to claim 1, wherein each said sector is contiguous to a plurality of spokes, the oblique portion of the outer edge of the sector being cut back in line with the hooks of some of said spokes.

3. Disc according to claim 1, wherein air channels are provided in the backs of said sectors for purposes of internal ventilation.

4. Disc according to claim 1, having a total of either six or eight spokes.

5. Disc according to claim 1, wherein said core is made of metal and said pads are made of a composite material such as carbon-carbon or carbon-silicon carbide.

* * * * *